United States Patent
Nishikawa (10) Patent No.: US 11,524,496 B2
(45) Date of Patent: Dec. 13, 2022

(54) IMAGE RECORDING APPARATUS, CONTROL METHOD, AND STORAGE MEDIUM

(71) Applicant: CANON KABUSHIKI KAISHA, Tokyo (JP)

(72) Inventor: Fumikazu Nishikawa, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 16/828,744

(22) Filed: Mar. 24, 2020

(65) Prior Publication Data

US 2020/0307179 A1 Oct. 1, 2020

(30) Foreign Application Priority Data

Mar. 29, 2019 (JP) .............................. JP2019-068048

(51) Int. Cl.
 *B41J 2/045* (2006.01)
 *B41J 2/12* (2006.01)
 *B41J 2/17* (2006.01)

(52) U.S. Cl.
 CPC ............. *B41J 2/04501* (2013.01); *B41J 2/12* (2013.01); *B41J 2002/1735* (2013.01)

(58) Field of Classification Search
 CPC .. B41J 2/04501; B41J 2/12; B41J 2002/1735; B41J 2/04505; B41J 2/04508; B41J 2/04513; B41J 15/046; B41J 15/24; B41J 2029/3935; B41J 2/04503; B41J 29/393; H04N 1/6033; H04N 1/6036; H04N 1/603
 See application file for complete search history.

(56) References Cited

U.S. PATENT DOCUMENTS

| | | |
|---|---|---|
| 2013/0342861 A1 | 12/2013 | Sato |
| 2015/0331639 A1 | 11/2015 | Piazza et al. |
| 2016/0191749 A1 | 6/2016 | Mitsubori |
| 2016/0352977 A1 | 12/2016 | Ogawa et al. |

FOREIGN PATENT DOCUMENTS

JP 2012-236312 A 12/2012

*Primary Examiner* — Kristal Feggins
(74) *Attorney, Agent, or Firm* — Canon U.S.A., Inc. I.P. Division (57) ABSTRACT

A determination is made on whether or not a recording medium is held in a state where calibration is executable, and the execution is pending in a case where the recording medium is not held. When the execution is pending, the determination is made again after a predetermined period elapses, and the calibration is executed in a case where the recording medium is held.

19 Claims, 10 Drawing Sheets

| RECORDING MEDIUM TYPE | EXECUTION STATE | PENDING FACTOR |
|---|---|---|
| COATED PAPER | UNEXECUTED | — |
| HEAVYWEIGHT COATED PAPER | EXECUTION PENDING | NO FEED |
| GLOSSY PHOTO PAPER | EXECUTION PENDING | NO FEED |
| SEMI-GLOSS PHOTO PAPER | EXECUTED | — |

IMAGE RECORDING APPARATUS, CONTROL METHOD, AND STORAGE MEDIUM

BACKGROUND OF THE INVENTION

Field of the Invention

The present invention relates to an image recording apparatus including a calibration function, a control method for the image recording apparatus, and a storage medium.

Description of the Related Art

Up to now, an image recording apparatus including a color calibration function has been used. The color calibration function is a function for ensuring the quality of a recorded image, and stable image outputs can be obtained by correcting image output fluctuations due to individual differences among image recording apparatuses and the aging of the apparatus. The above-described color calibration function is to be executed at an appropriate timing. For example, the function is executed in a case where a recording amount since color calibration was previously executed exceeds a previously set threshold, that is, a case where the number of days elapsed since the color calibration was previously executed exceeds a previously set threshold, or the like. Methods of instructing execution of the color calibration include a method of directly instructing the execution from an operation unit, by an operator of the image recording apparatus, and a method of automatically executing the color calibration by using the reception of a job as a trigger for instructing image recording.

Japanese Patent Laid-Open No. 2012-236312 describes that, since calibration and printing are not to be performed at the same time, a print job is analyzed to determine which one of the calibration and the print job is prioritized. In a case where the print job is prioritized, the execution of the calibration is postponed, and the calibration is executed after a designated postponement period has elapsed.

In a case where a recording medium of a type used for the execution of the calibration process is not set in the recording apparatus, a user is not necessarily in a situation where the user can immediately replenish the recording medium. In addition, thereafter, the user may not necessarily instruct the execution of the calibration process at a time when the appropriate recording medium is set.

SUMMARY OF THE INVENTION

The present invention is aimed at providing an image recording apparatus that determines a condition necessary for the execution of calibration, and executes calibration in accordance with the result of said determination.

According to an aspect of the present invention, there is provided an image recording apparatus including a recording unit configured to record an image on a recording medium by imparting a recording material based on image data, a reception unit configured to receive an instruction, to execute calibration, from a host apparatus, the calibration including recording a test pattern on the recording medium using the recording unit, and generating correction data based on a measurement result of the test pattern, a determination unit configured to determine whether or not a predetermined target recording medium of one or more types is being fed into the image recoding apparatus, in a state where the test pattern is recordable, and an execution unit configured to execute calibration using the predetermined target recording medium, determined by determined by the determination unit as being fed, in which, in a case where the target recording medium is not fed into the printing apparatus, in a state where the test pattern is recordable, the determination unit is configured to determine again, after a predetermined period has elapsed and the printing apparatus is in a state where the test pattern is recordable, whether or not the recoding medium being fed into the printing apparatus is the target recording medium.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Hereinafter, embodiments of this invention will be described in detail by way of illustration with reference to the drawings. It is noted however that a relative arrangement of components described in this embodiment, a display screen, and the like are not intended to limit a scope of this invention to those unless specifically stated otherwise.

Figure 1A:
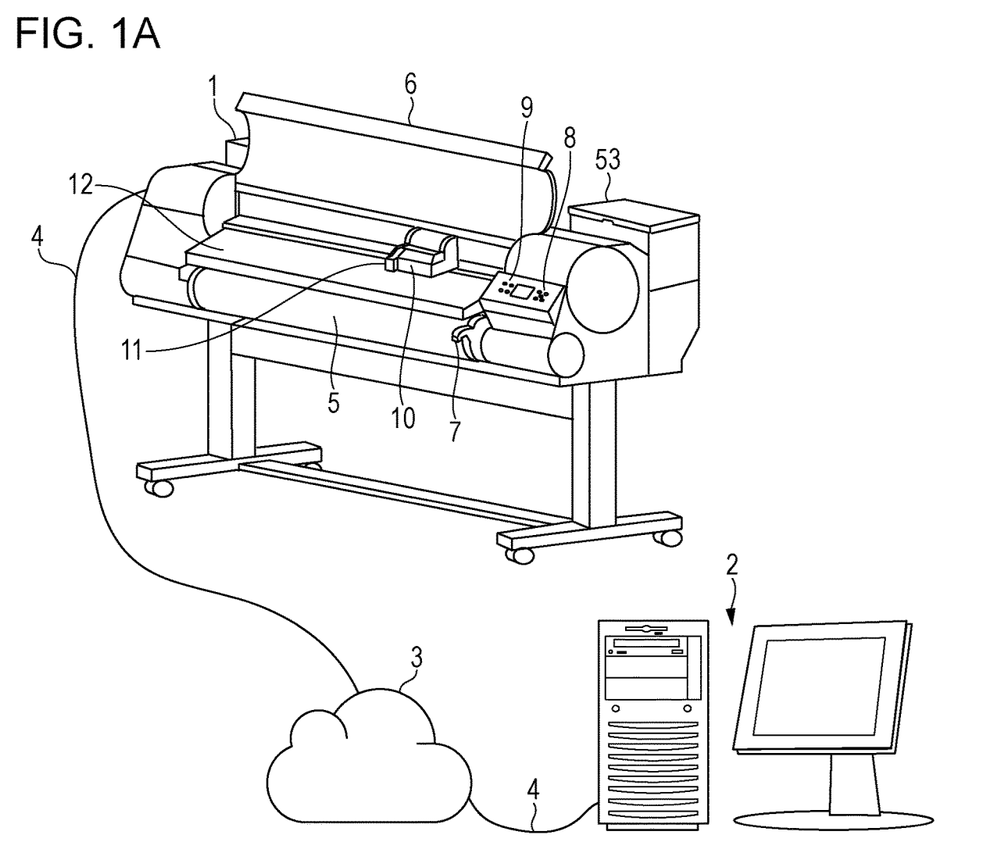
FIGS. 1A and 1B illustrate a recording system constituted by a host apparatus and an image processing apparatus.

FIG. 1A illustrates a recording system according to the present embodiment. This recording system includes a host apparatus 2 serving as an external apparatus, and an image recording apparatus 1 connected to the host apparatus 2. The image recording apparatus 1 records an image on a recording medium on the basis of information input from the outside or information previously held therein. The image recording apparatus 1 according to the present embodiment is an inkjet recording apparatus, and includes a recording head including a plurality of recording elements. When ink containing a coloring material as a recording material is imparted from a recording head, the image is recorded on the recording medium. The host apparatus 2 is connected to the image recording apparatus 1 via an Internet network 3 and a network cable 4, and transfers recording data and information for controlling the image recording apparatus 1 (hereinafter, referred to as a recording job) to the image recording apparatus 1. In FIG. 1A, the single image recording apparatus 1 is connected to the host apparatus 2, but a mode may be adopted in which a plurality of the image recording apparatuses 1 are connected to the host apparatus 2. The host apparatus 2 transmits an execution instruction and an execution condition for color calibration to the image recording apparatus 1. It is noted that a recording system to which a plurality of the host apparatuses 2 are connected may also be used. For example, a host apparatus that transmits an instruction for the color calibration to the image recording apparatus 1 may be different from a host apparatus that transmits a job for instructing the recording of the image. It is noted that the Internet network is used herein, but a local area network is also applicable. In addition, a wireless network is also applicable instead of a wired network.

A recording medium 5 is roll paper wound in a roll shape, and is held in a roll paper holder that is not illustrated in the drawing. The image recording apparatus 1 according to the present embodiment can hold the recording media 5 of a plurality of types, and includes a plurality of respectively corresponding roll paper holders. A main cover 6 is opened when a user sets the recording medium 5 or when the recording head or a cutter unit which will be described below is replaced. FIG. 1A illustrates a state where the main cover 6 is opened. A release lever 7 is a lever for fixing the recording medium 5 by pressing a roller which will be described below against a platen, and releasing the roller from the platen to allow the recording medium 5 to be inserted. FIG. 1A illustrates a state where the release lever 7 is released. An operation key 8 is a member configured to accept various settings related to the operation of the image recording apparatus 1, and an input with respect to an operation from the user in a case where the image recording apparatus 1 is used alone.

The operation key 8 is constituted by respective keys such as up, down, left, right, OK, and cancel. A display panel 9 performs display of a state of the image recording apparatus 1, display of setting contents in a case where the operation settings of the image recording apparatus 1 are input by using the operation key 8, and the like. Information such as a type of the recording medium on which the image is recorded or a recording image quality is also set by using the operation key 8 and the display panel 9. A carriage 10 and a cutter unit 11 integrated with the carriage are disposed inside the main cover 6. The carriage 10 scans in a left-and-right direction (scanning direction) in the drawing, and the recording material is accordingly imparted from the recording head. Thus, the image is recorded on the recording medium 5. The cutter unit 11 cuts off the recording medium 5 on which the image is recorded. A platen 12 supports the recording medium 5, and the recording medium 5 is conveyed on the platen 12 in a conveyance direction intersecting with the scanning direction of the carriage. An ink tank cover 53 is opened when an ink tank that holds ink is mounted or replaced.

Figure 1B:
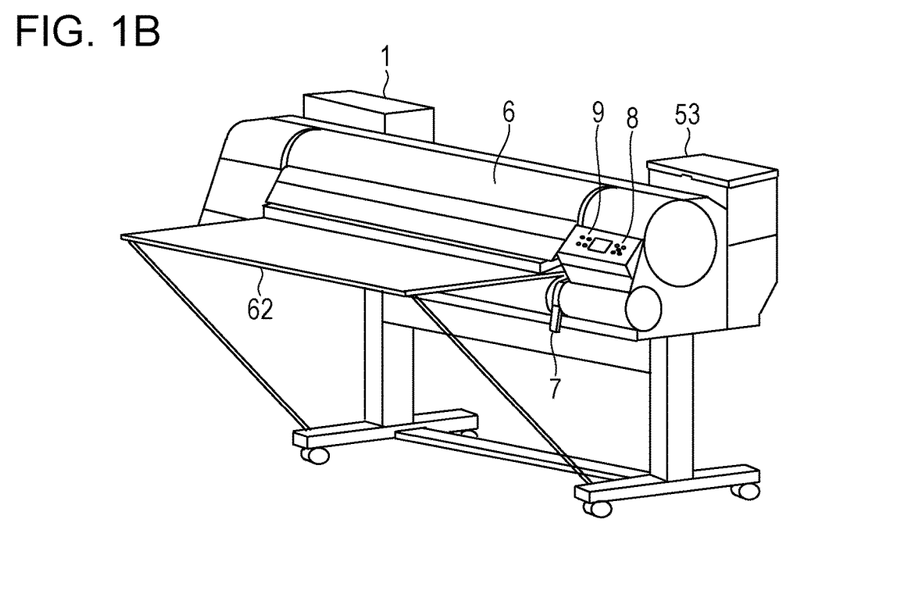

FIG. 1B illustrates a state where a loading portion 62 is mounted to the image recording apparatus 1, and a record product on which the image is recoded is loaded on the loading portion 62. FIG. 1B illustrates a state where the main cover 6 and the release lever 7 are closed.

Figure 2:
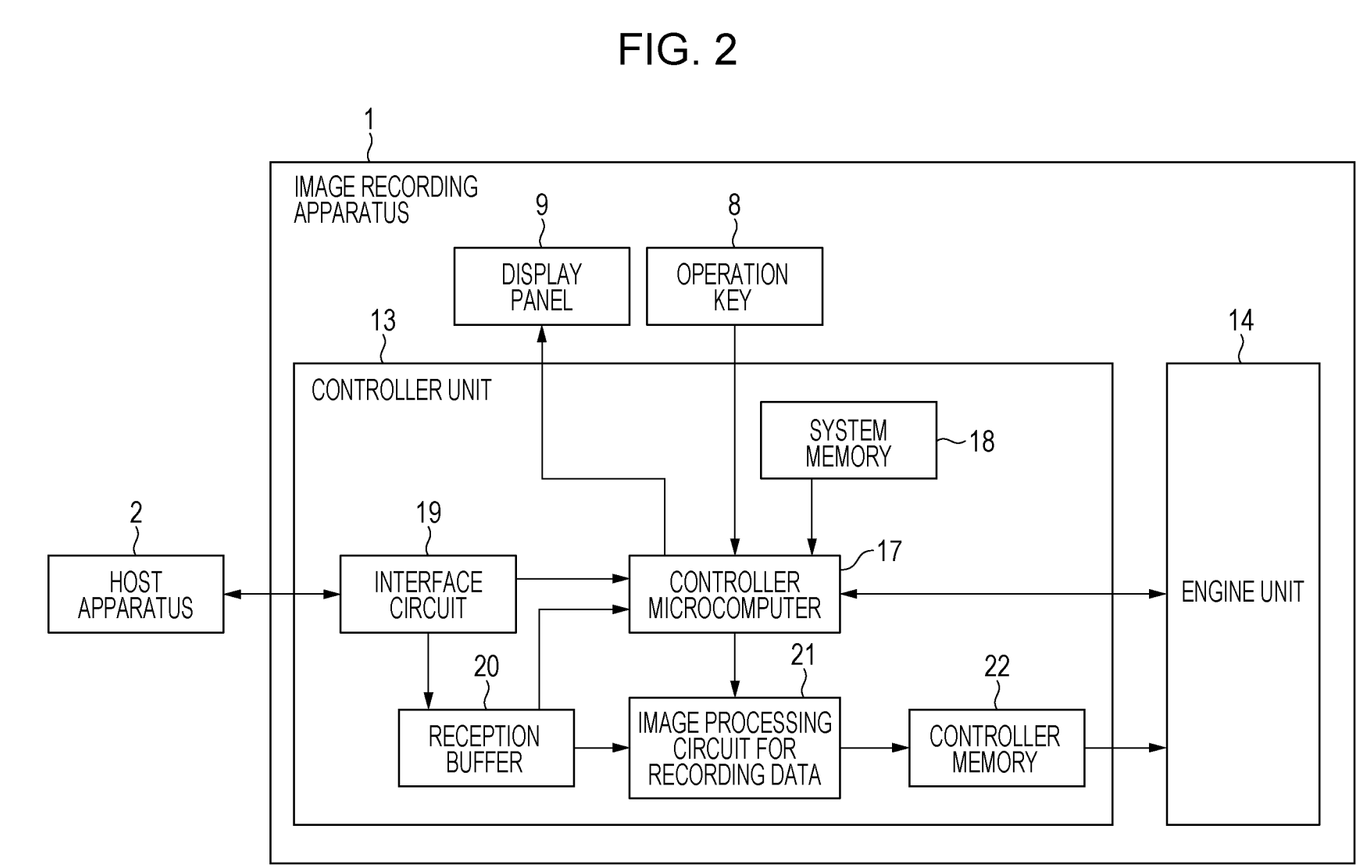
FIG. 2 illustrates an outline of a configuration of an image recording apparatus.

FIG. 2 illustrates an outline of a configuration of the image recording apparatus 1. In FIG. 2, the image recording apparatus 1 includes a controller unit 13 and an engine unit 14. The controller unit 13 receives a recording job input from the host apparatus 2 and performs processing such as an analysis of the recording job to generate recording data in a recordable format in the engine unit 14. The controller unit 13 also accepts the instruction for the color calibration execution and the setting of the color calibration execution condition from the host apparatus 2. In addition, the controller unit 13 accepts the input from the operation key 8 to set an operation environment of the image recording apparatus 1, and also causes the display panel 9 to display the state of the image recording apparatus 1 and an instruction for urging a user to perform an operation by the operation key 8. The engine unit 14 feeds the recording medium and records the image on the basis of the recording data generated by the controller unit 13 to discharge the recording medium. In a case where an error such as jamming of the recording medium or no feed of the recording medium occurs in the engine unit 14, the controller unit 13 is notified of that effect. The controller unit 13 causes the display panel 9 to display that the error has occurred, and the host apparatus 2 is notified of that effect. The controller unit 13 includes a controller microcomputer 17, a system memory 18, an interface circuit 19 (hereinafter, which may be referred to as an I/F circuit in some cases), a reception buffer 20, an image processing circuit 21 for recording data, and a controller memory 22.

Next, an operation in the image recording apparatus 1 in FIG. 2 will be described. The controller microcomputer 17 governs overall control such as the analysis of the recording job input from the outside, image processing, and conversion processing into a bitmap. The job input from the host apparatus 2 is stored in the reception buffer 20 via the I/F circuit 19. The I/F circuit 19 then notifies the controller microcomputer 17 of the job reception. The job includes image data and various setting information such as a size and a type of the recording medium. The controller microcomputer 17 analyses the received job, and instructs the image processing circuit 21 for recording data and the engine unit 14 to record the image. The image data stored in the reception buffer 20 is subjected to image processing and converted by the image processing circuit 21 into a bitmap format. The converted image data is stored in the controller memory 22, and is then transmitted to the engine unit 14.

The execution instruction and the execution condition for the color calibration are input from the host apparatus 2 to the controller microcomputer 17 via the I/F circuit 19. The controller microcomputer 17 performs processing based on operation contents input from the user using the operation key 8. When the engine unit 14 notifies the controller microcomputer 17 of a recording state or error contents, the controller microcomputer 17 causes the display panel 9 to display the contents, and the host apparatus 2 is notified of that effect.

Figure 3A:
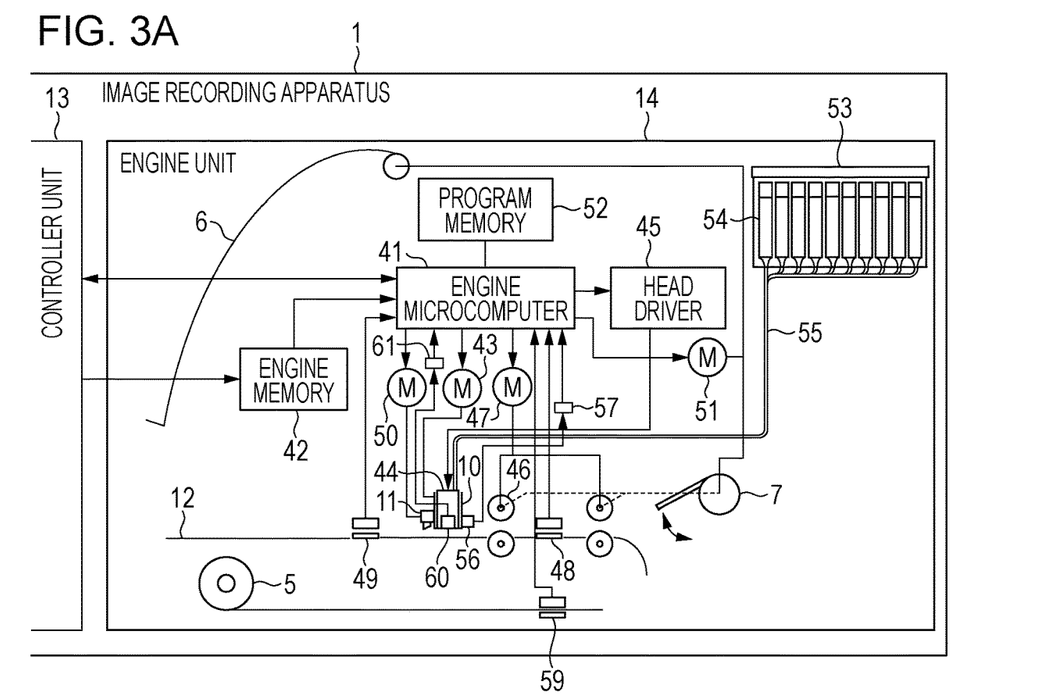
FIGS. 3A and 3B illustrate an internal configuration of an engine unit.

FIG. 3A illustrates an internal configuration of the engine unit 14. In FIG. 3A, the recording medium 5 is not fed to a location facing a recording head 44. This is a state where the main cover 6 is opened, the release lever 7 is released, and the loading portion 62 is not mounted. The engine unit 14 includes an engine microcomputer 41, an engine memory 42, a carriage motor 43, the recording head 44, and a head driver 45. Furthermore, the engine unit 14 includes a conveyance roller 46, a conveyance motor 47, a medium feed sensor 48, a medium discharge sensor 49, a cutter motor 50, a solenoid 51, a program memory 52, the ink tank cover 53, ink tanks 54, and ink tubes 55. According to the present embodiment, the ink tanks 54 and the ink tubes 55 are disposed for ten colors each. Furthermore, the engine unit 14 includes a recording medium sensor 56, a recording medium sensor signal processing circuit 57, a color sensor 60, and a color sensor signal processing circuit 61.

As illustrated in FIG. 3A, the conveyance roller 46 or the carriage 10 is not driven in a state where the main cover 6 is opened and the release lever 7 is released. Since the conveyance roller 46 is in a state of being away from the platen 12 due to the release of the release lever 7, the recording medium 5 can be inserted onto the platen 12. When the main cover 6 and the release lever 7 are closed, feed and recording operations can be started.

Figure 3B:
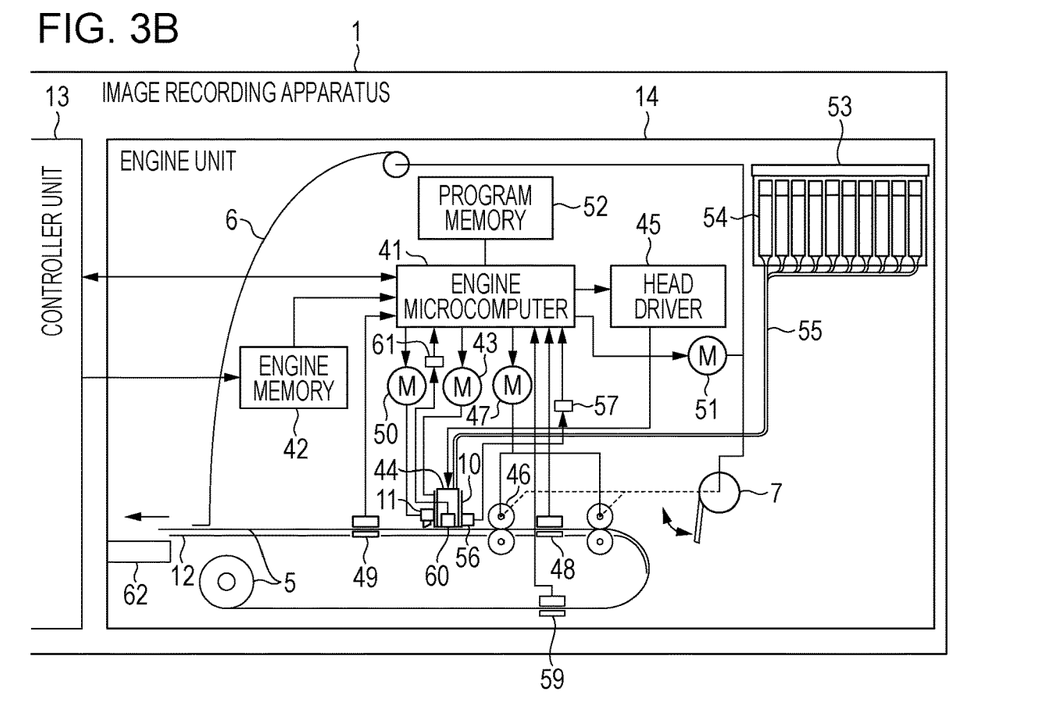

FIG. 3B illustrates a state where the recording medium 5 is fed to the location facing the recording head 44, and the main cover 6 and the release lever 7 are closed. The engine microcomputer 41 governs overall control such as the feed and discharge of the recording medium 5 and control of the recording head 44. First, bitmap data transmitted from the controller unit 13 is stored in the engine memory 42. With regard to the feed of the recording medium 5 in the image recording apparatus 1 in FIG. 3B, when the user inserts a leading edge of the recording medium 5 into a feed portion, a loading sensor 59 senses the leading edge. Thus, the image recording apparatus 1 can feed the recording medium 5, and the feed operation is started. The feed operation includes driving the conveyance motor 47 to rotate the conveyance roller 46, and conveying the leading edge of the recording medium 5 to the location facing the recording head 44. As a result, the feed operation is completed, and the image can be recorded. Whether or not the feed and the discharge are normally operated can be discriminated by sensing the presence or absence of the recording medium 5 by the medium feed sensor 48 and the medium discharge sensor 49. The recording medium sensor 56 is disposed on the carriage 10, and senses the presence or absence of the recording medium. When the carriage 10 reciprocally scans in the scanning direction, the recording medium sensor 56 continuously senses the presence or absence of the recording medium, and detects a width of the recording medium. A signal detected by the recording medium sensor 56 is amplified by the recording medium sensor signal processing circuit 57, and loaded into the engine microcomputer 41.

The color sensor 60 is disposed on the carriage 10, and senses a density of the image recorded on the recording medium. The scanning of the carriage 10 and the conveyance of the recording medium based on the rotation of the conveyance roller 46 are alternately performed. The color sensor 60 moves to any location on the recording medium, and reads the density of the image. A reading result is subjected to signal processing by the color sensor signal processing circuit 61, and input to the engine microcomputer 41. The reading result input to the engine microcomputer 41 is used in the color calibration, and a correction value for correcting the image data is calculated on the basis of the reading result.

The recording head 44 is mounted to the carriage 10, and driven by the head driver 45. The ink of the ten colors is supplied from the ink tanks 54 to the recording head 44 via the insides of the ink tubes 55. The carriage 10 reciprocally scans in the scanning direction by the carriage motor 43, and ink droplets are imparted from the recording head 44. Thus, the image is recorded on the recording medium 5. When the recording operation is ended, the cutter unit 11 disposed integrally with the carriage 10 descends by the cutter motor 50. Along with the scanning of the carriage 10 in the scanning direction, the recording medium 5 is cut off by the cutter unit 11. The cut recording medium 5 is loaded on the loading portion 62 as a record product. During the feed operation of the recording medium 5 and during the image recording operation, the main cover 6 and the release lever 7 are locked in a closed state by the solenoid 51. Thus, the main cover 6 is not to be opened, and the release lever 7 is not to be released. In a case where the jamming of the recording medium 5 is sensed by the medium feed sensor 48 and the medium discharge sensor 49, the recording operation is pending, and the controller unit 13 is notified of that effect.

Next, an image processing method of generating recording data for recording an image in the host apparatus 2 and the image recording apparatus 1 will be described with reference to FIG. 4.

Figure 4:
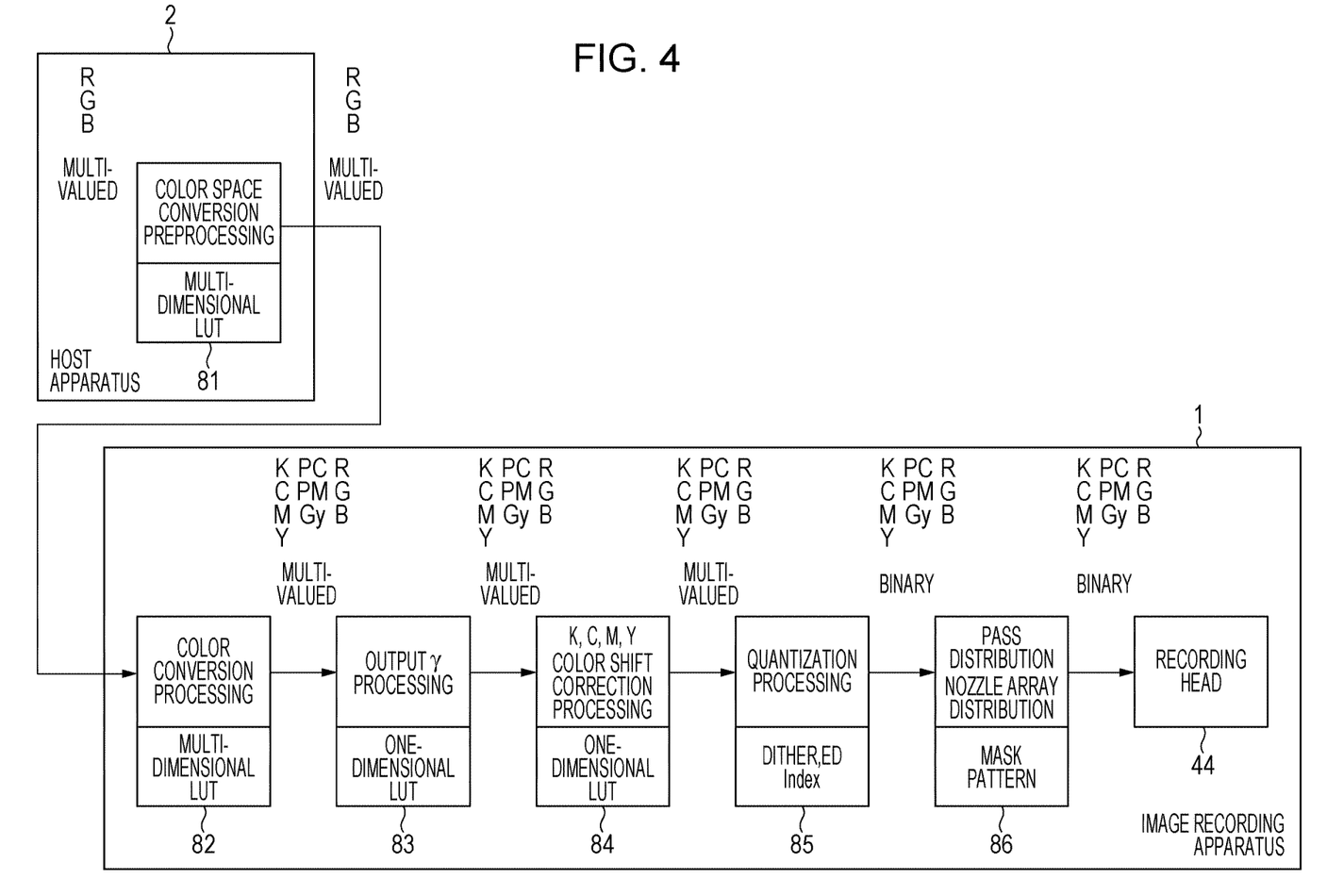
FIG. 4 is a block diagram illustrating image processing at the time of image recording.

FIG. 4 is a block diagram illustrating the image processing at the time of image recording according to the present embodiment. First, 8-bit image data (luminance data) for each of colors including red (R), green (G), and blue (B) (256 gray levels, respectively) is input. Then, 1-bit bit image data (recording data) corresponding to each ink of ten colors including cyan (C), magenta (M), yellow (Y), black (K), photo cyan (PC), photo magenta (PM), gray (Gy), red (R), green (G), and blue (B) is finally output. It is noted that the types of the ink and gradation values are not limited to the above-described mode.

First, color space conversion preprocessing (hereinafter, also referred to as upstream color preprocessing) is performed in the host apparatus 2. Herein, image data represented by multi-valued luminance signals of R, G, and B is converted into multi-valued data of R, G, and B using a multi-dimensional look-up table (LUT) 81. This color space conversion preprocessing is processing for correcting a difference between a color space of an input image represented by image data of R, G, and B in a recording target and a color space that can be reproduced by the image recording apparatus 1.

The data of each of the colors R, G, and B to which the upstream color preprocessing has been applied is transmitted to the image recording apparatus 1, and color conversion processing (also referred to as downstream color processing) is performed. Herein, the data of each of the colors R, G, and B is converted into multi-valued data of C, M, Y, and K using a multi-dimensional LUT 82. This color conversion processing is processing for performing color conversion of input-system RGB-based image data which is represented by luminance signals into output-system CMYK-based image data which is to be represented by density signals. The input data is created by three primary colors (RGB) based on additive color mixture of a light emitting body such as a display in many cases. However, since three primary colors (CMY) based on subtractive color mixture where a color is represented by light reflection are used in the image recording apparatus, the above-described color conversion processing is necessary.

An output γ correction is performed by a one-dimensional LUT 83 for each color on multi-valued data of C, M, Y, K, PC, PM, Gy, R, G, and B to which the downstream color processing has been applied. Normally, a linear relationship is not established between the number of dots recorded per unit area of the recording material and recording characteristics such as a reflection density obtained by measuring the recording image. For this reason, for example, to establish a linear relationship between an 10-bit input gray level of each of C, M, Y, K, PC, PM, Gy, R, G, and B and a density level of the image recorded at the gray level, output γ correction processing for correcting the multi-valued input gray level of each color is performed.

Color shift correction processing is performed on the multi-valued data of C, M, Y, K, PC, PM, Gy, R, G, and B on which the output γ correction has been applied, by using a one-dimensional LUT 84 for color shift correction for each color. In general, a table created for a recording head that exhibits standard recording characteristics is used as an output γ correction table (one-dimensional LUT 83) used for output γ processing in many cases. However, since the recording heads have individual differences with regard to ink ejection characteristics, appropriate output results with respect to all the image recording apparatuses are not obtained by using only the output γ correction table for correcting the recording characteristics by the image recording apparatus using a recording head that exhibits standard ink ejection characteristics. The color shift correction processing is applied to unevenness in the recording characteristics due to the above-described individual differences of the recording heads. It is noted that processing for generating the one-dimensional LUT 84 for color shift correction which is used in this color shift correction processing is the above-described color calibration.

Next, halftone processing based on dither, an error diffusion method (ED), or the like, and quantization processing based on Index expansion (85) are applied to the multi-valued data of C, M, Y, K, PC, PM, Gy, R, G, and B to which the color shift correction processing has been applied. Binary data of C, M, Y, K, PC, PM, Gy, R, G, and B is generated after these processes are performed. Pass distribution processing 86 is performed on the generated binary data of each ink color by a mask pattern or the like, and recording data for imparting the ink droplets on the recording medium from nozzles of the recording head 44 is generated.

Next, the color calibration corresponding to a feature configuration according to the present embodiment will be described with reference to FIG. 5, FIG. 6, FIG. 7, and FIG. 10. Flowcharts illustrated in FIG. 5, FIG. 6, FIG. 7, and FIG. 10 are program diagrams illustrating program flows which are stored in one of the system memory 18 in FIG. 2 and the program memory 52 in FIGS. 3A and 3B and which are processed by the controller microcomputer 17 and the engine microcomputer 41 that function as computers. The controller microcomputer 17 and the engine microcomputer 41 execute control operations in a coordinated manner in accordance with the program flows. It is noted that a mode may also be adopted in which the present programs are stored in the host apparatus 2 and executed in the image recording apparatus 1.

Figure 5:
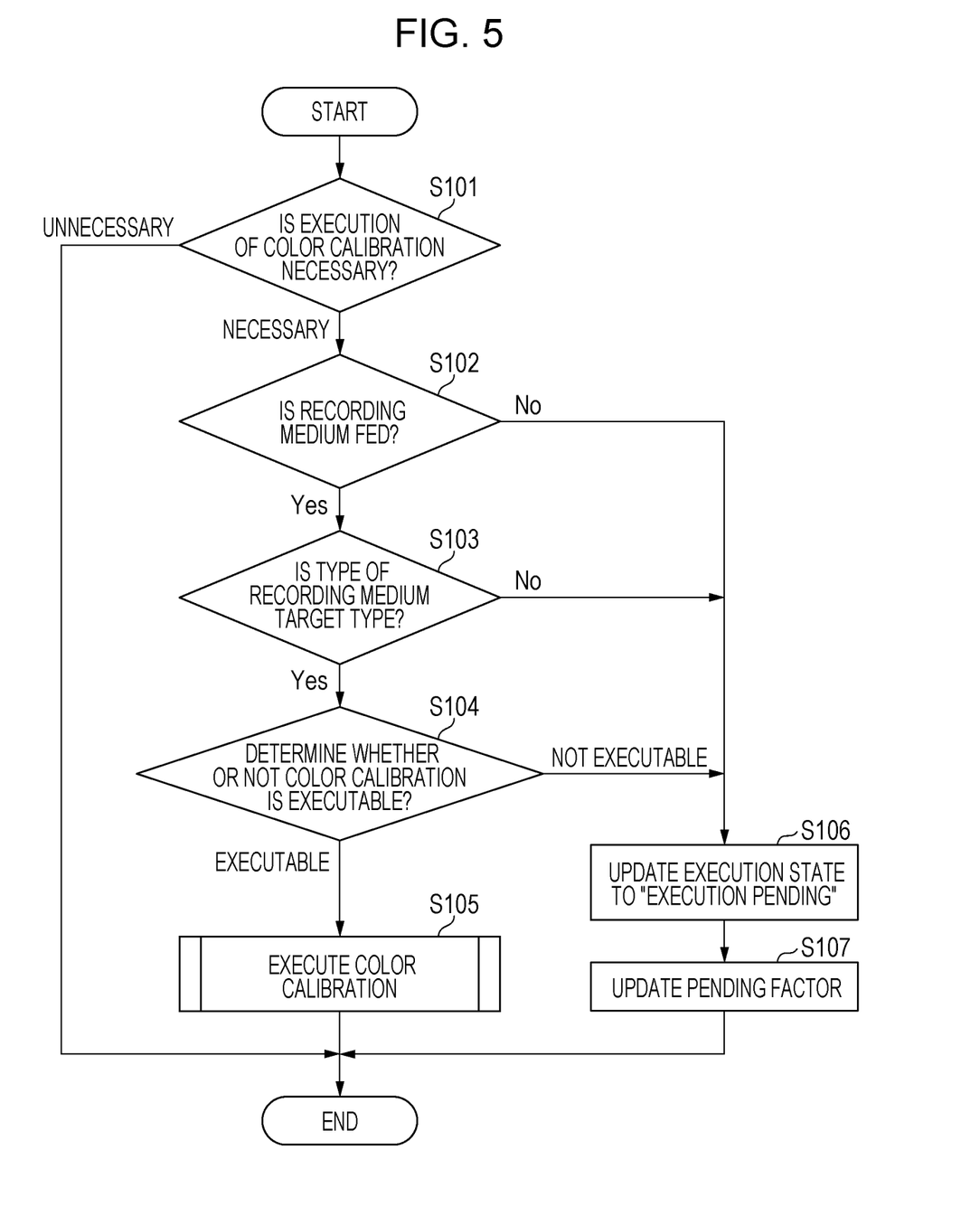
FIG. 5 is a flowchart of processing for determining whether or not calibration is executed.

FIG. 5 illustrates processing for determining whether or not the execution of the color calibration is necessary. This processing is started at the following predetermined timing. Examples of the timing include a timing when a power supply is turned on, a timing when a recording job is received, a timing when the recording job is ended, a timing each time a predetermined number of days elapse, a timing when the instruction for the execution of the calibration is issued from the user, a timing when the instruction for the execution of the calibration is issued from the host apparatus 2, a timing when information indicating that the recording medium 5 is newly set in a holding member is obtained, and the like. It is noted that this processing may also be started by determining whether or not these conditions are satisfied at a predetermined interval by way of polling.

It is noted that the color calibration is not necessarily to be executed with respect to any type of recording media, and types of the recording media where the color calibration is executable are limited. This flow is executed with respect to all the types of the recording media where the color calibration is executable. That is, this flow is executed the number of times equivalent to the number of types of the recording media where the color calibration is executable.

When the instruction for the color calibration from the user or the instruction for the color calibration from the host apparatus 2 is received, either the instruction in which the type of the recording medium is designated or the instruction in which the type of the recording medium is not designated can be accepted. The instruction for the calibration includes type information indicating a type of a recording medium set as a calibration target. In a case where the instruction is issued without designating the type of the recording medium, the color calibration is executed the number of times equivalent to the number of types where the color calibration is executable. In a case where the instruction is issued by designating the type of the recording medium, this flow is executed with respect to only the designated type. It is noted however that this flow is not executed in a case where the recording medium where the color calibration is not executable is designated. Hereinafter, descriptions will be provided along respective steps of the flow.

In S101, it is determined whether or not the execution of the color calibration is necessary. A condition used for the determination may be set by taking characteristics of the apparatus into account, but one or more conditions are set herein among the following plural types of conditions. The conditions include a case where a predetermined number of sheets are recorded after the previous execution of the color calibration, a case where a predetermined number of days elapse after the previous execution of the color calibration, a case where the recording head 44 is replaced after the previous execution of the color calibration, and a case where a predetermined period elapses after the end of the previous recording operation. In these cases, since there is a possibility that the ink ejection characteristics of the recording head may change to affect the image quality of the recorded image, it is determined that the execution of the color calibration is necessary. In a case where a change is made to the information (parameter) of the recording medium, since there is a possibility that the recording characteristics to the recording medium may change to affect the recording image quality, it is determined that the execution of the color calibration is necessary. In addition, in a case where the received recording job is a high quality mode too, it is determined that the execution of the color calibration is necessary before the recording operation. Furthermore, in a case where the execution of the color calibration is instructed from the host apparatus 2 or the user via the operation key 8 and the display panel 9 too, it is determined that the execution of the color calibration is necessary. In a case where it is determined that the execution of the color calibration is necessary, the flow proceeds to S102, and in a case where it is determined that the execution is unnecessary, this flow is ended.

First, it is determined whether or not the recording medium 5 of the type used for the color calibration is fed in a state where the color calibration is executable. According to the present embodiment, whether or not the recording medium 5 is fed and whether or not the remaining amount of the recording medium 5 is equal to or higher than a necessary amount are determined. The determination herein on whether or not the recording medium 5 is fed depends on whether or not the feed operation is completed. According to the present embodiment, as described above, when the loading sensor 59 senses the leading edge of the recording medium 5, and the leading edge is conveyed to the location facing the recording head, it is regarded that the feed operation is completed. In S102, it is determined whether or not the recording medium 5 is fed. In a case where the recording medium 5 is fed, the flow proceeds to S103, and in a case where the recording medium 5 is not fed, the flow proceeds to S106. In S103, it is determined whether or not the type of the fed recording medium 5 is a type of the target where the color calibration is executed this time. In a case where this is the type of the target, the flow proceeds to S104, and in a case where this is not the type of the target, the flow proceeds to S106.

In S104, it is determined whether or not the color calibration is executable. The determination in S104 on whether or not the color calibration is executable will be described with reference to FIG. 6. In S201, it is determined whether or not the remaining amount of the recording medium is equal to or higher than a necessary amount for the execution of the color calibration. Since a test pattern including a color patch is recorded in the color calibration, the determination is made depending on whether or not the recording medium has the remaining amount equal to or longer than a length of the test pattern. In a case where the remaining amount is shorter than the length of the test pattern, the flow proceeds to S207, and in S207, it is determined that the color calibration is not executable. In a case where the remaining amount is equal to or longer than the length of the test pattern, the flow proceeds to S202.

Figure 6:
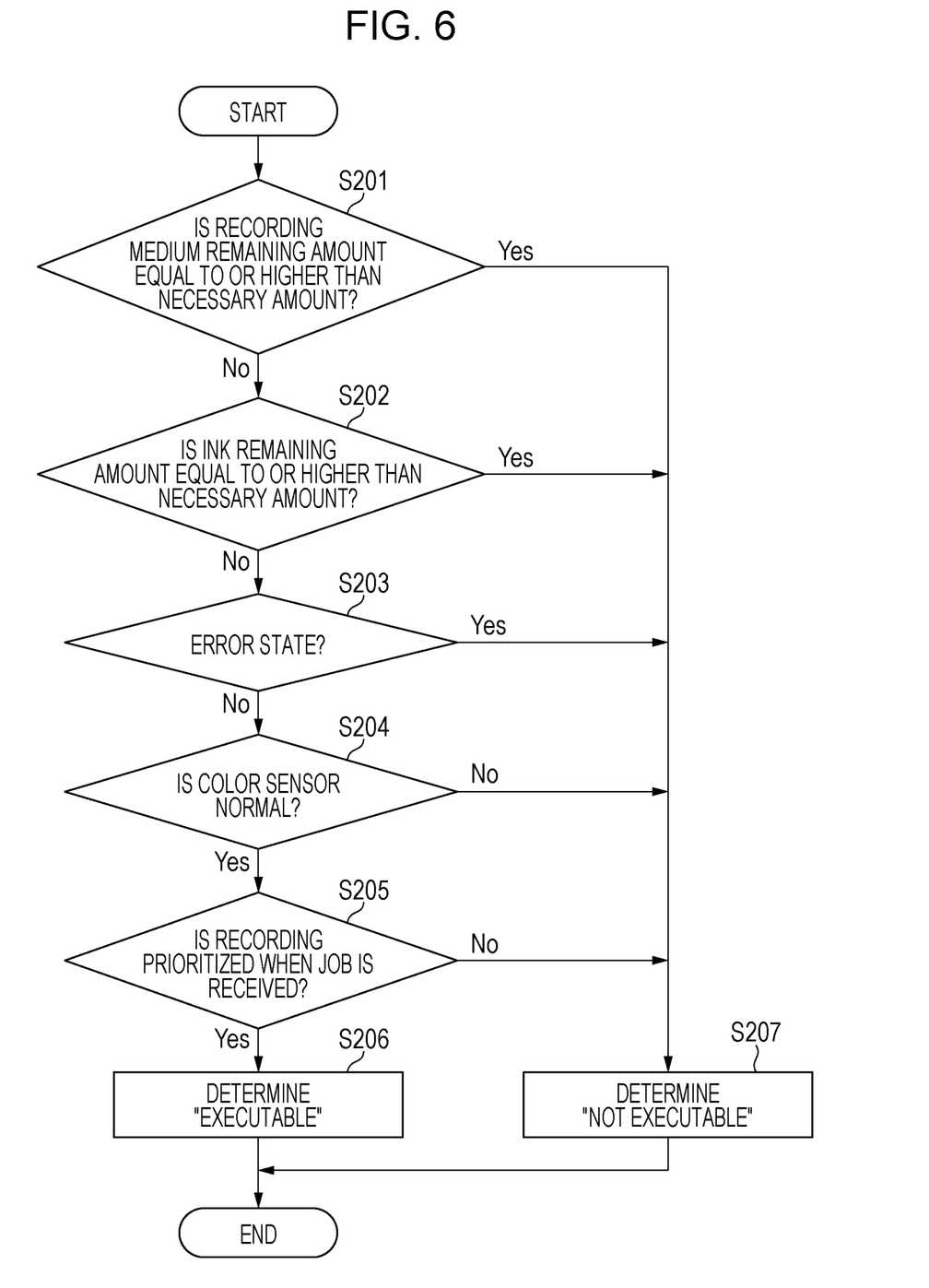
FIG. 6 is a flowchart of determination processing on whether or not the calibration is executable.

In S202, it is determined whether or the remaining amount of the ink is equal to or higher than the necessary amount for the execution of the color calibration. The determination is made depending on whether or not the remaining amount is equal to or higher than a necessary amount for the record of the color patch. In a case where the remaining amount is lower than the necessary amount for the record of the color patch, the flow proceeds to S207, and the remaining amount is equal to or higher than the necessary amount for the record of the color patch, the flow proceeds to S203.

In S203, it is determined whether or the image recording apparatus 1 is in a state where the test pattern of the color calibration is recordable. In a case where the image recording apparatus 1 is not in a state where the test pattern is recordable, the flow proceeds to S207, and in a case where the image recording apparatus 1 is in a state where the test pattern is recordable, the flow proceeds to S204. Next, in S204, a state of the color sensor 60 is determined. In a case where the color sensor 60 is in a state where the color patch can be measured, the flow proceeds to S207, and the color sensor 60 is in a state where the color patch is not to be measured, the flow proceeds to S205. In S205, in a case where the recording job is received, a determination is made on whether the recording of the image is prioritized or the execution of the color calibration is prioritized. In a case where this processing is executed at a time other than a time when the job is received, this determination is skipped, and the flow proceeds to S206. In a case where the job includes information indicating that the recording of the image is prioritized, the flow proceeds to S207. In a case where the job does not include the information indicating that the recording is prioritized, it is determined that the color calibration may be prioritized over the image recording, and the flow proceeds to S205. In S206, it is determined that the color calibration is executable, and in S207, it is determined that the color calibration is not executable. A branch destination in S104 of the flow in FIG. 5 is decided depending on the determination result of this flow.

With reference to the flow in FIG. 5 again, it is determined in S104 that the color calibration is executable, the flow proceeds to S105, and it is determined that the color calibration is not executable, the flow proceeds to S106. In S105, the color calibration is executed. A detail of the execution processing of the color calibration will be described below with reference to FIG. 7. In S106, with regard to the recording medium of the type set as the target this time, a color calibration execution state is updated to "execution pending". An execution state of the color calibration is managed in a mode as illustrated in FIG. 8, and any one of execution information among "unexecuted", "executed", and "execution pending" is held in the system memory 18 for each type of the recording medium. An initial state is "unexecuted". In S105, in a case where the color calibration is executed, the information "executed" is stored with regard to the recording medium of the type being executed, and information related to an execution date is also stored at the same time. In S106, in a case where the state is updated to "execution pending", information regarding its pending factor is also held. The host apparatus 2 can obtain the information illustrated in FIG. 8 via a network such as the Internet. This information is used for display of a state in a management application or the like operating in the host apparatus 2, and control on the execution instruction for the color calibration with respect to the image recording apparatus 1 and color calibration condition settings. A plurality of image recording apparatuses 1 can be connected to the network, and those apparatuses can also be collectively managed by the host apparatus 2. In this case, information for identifying each of the recording apparatuses is obtained from the host apparatus 2.

With reference to FIG. 5 again, in S107, the pending factor of the color calibration is updated with regard to the recording medium of the type set as the target this time, and this flow is ended. In a case where the execution pending is found in the determination in S102 and S103, the pending factor updated herein is "no feed". In a case where it is determined that the execution is not to be performed in the color calibration execution propriety determination in S104 illustrated in FIG. 6, the pending factor updated is its determination factor.

According to the present embodiment, in a case where the execution becomes pending in the processing in FIG. 5, whether or not its pending factor is eliminated is periodically monitored each time a certain period elapses. This monitoring is performed, for example, every second. For example, in a case where the pending factor is "no feed", feed of the recording medium of the target type is monitored. In a case where it is sensed that the recording medium is fed, the flow in FIG. 10 which will be described below is executed, and it is determined again whether or not the color calibration is executable. At this time, in a case where it is determined that the color calibration is executable, the color calibration is automatically executed. It is noted that other than the method of periodically performing the monitoring, the flow in FIG. 10 which will be described below may be executed in a case where information indicating completion of the feed operation is detected, and the determination may be performed on whether or not the color calibration is executable.

It is noted that in a case where the color calibration is instructed from the user or the host apparatus 2 by designating the type of the recording medium, the color calibration is executed or the execution becomes pending with respect to the recording medium of the designated type. On the other hand, in a case where the color calibration is instructed from the user or the host apparatus 2 without designating the type of the recording medium, the color calibration is executed or the execution becomes pending with respect to the recording media of all types where the color calibration is executable.

Figure 7:
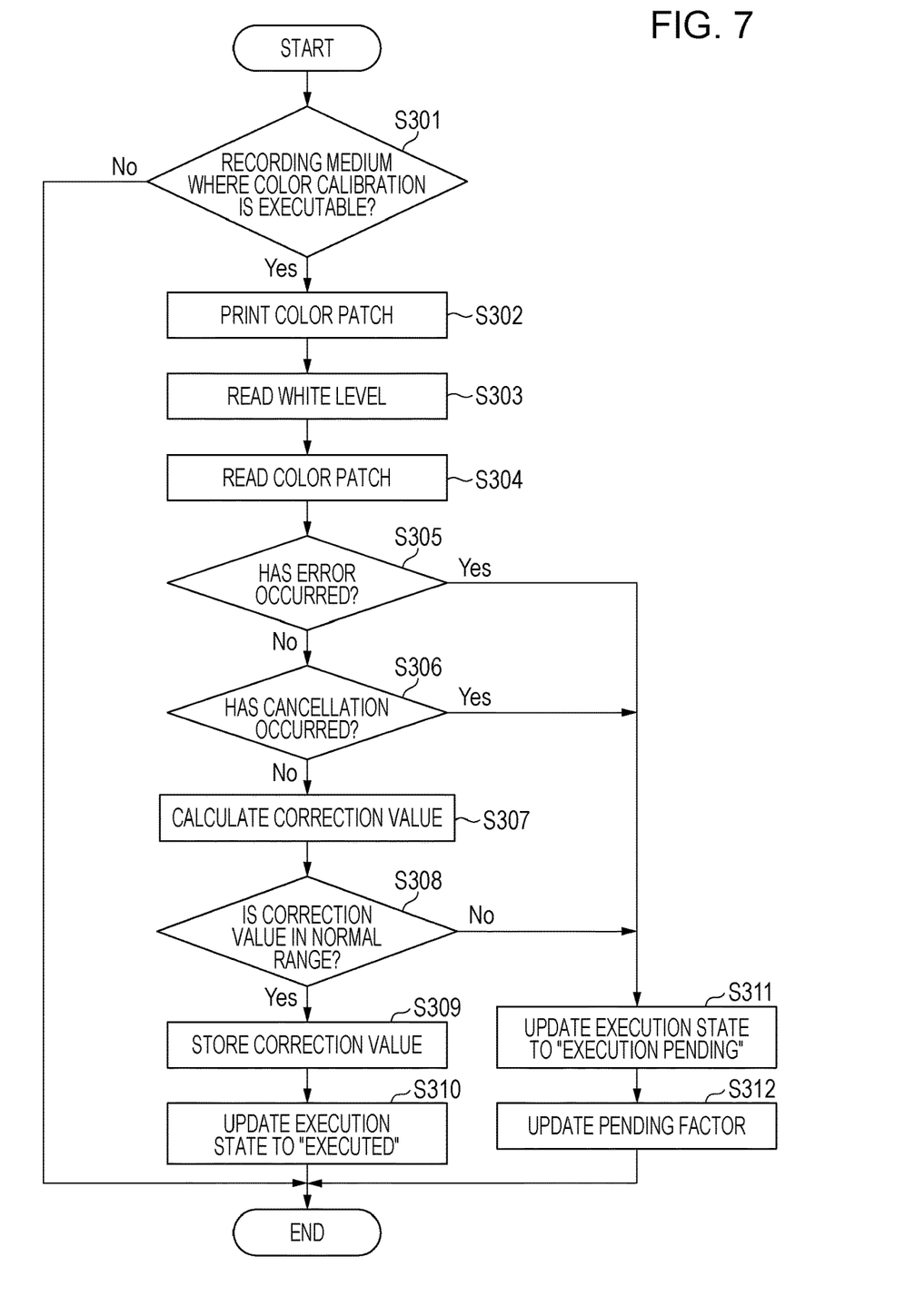
FIG. 7 is a flowchart of execution processing of the calibration.
Figure 8:
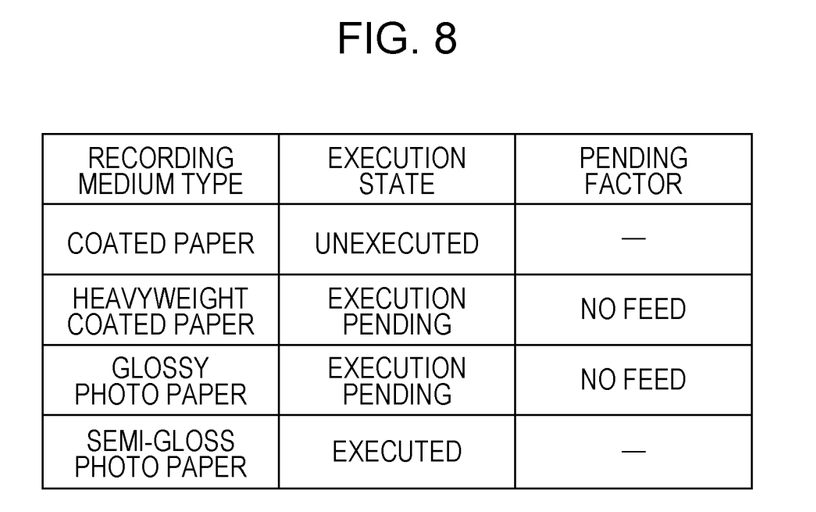
FIG. 8 illustrates execution information of the calibration.

FIG. 7 is a flowchart illustrating color calibration execution processing. In a case where it is determined in step S104 in FIG. 5 that the processing is executable, this processing is executed in step S105. In S301, it is discriminated whether or not the color calibration is executable with regard to the type of the recording medium. When the recording medium is of the type where the color calibration is executable, the flow proceeds to S302, and when this is not the case, this flow is ended. In S302, the color patch is recorded on the recording medium. A ground color of the recording medium 5 is measured in S303 by the color sensor 60 as a white level where the patch is not recorded. A measurement result of the white level is used when a density value of the color patch recorded in S302 is calculated. In S304, the color patch is measured by the color sensor 60, and a result obtained by processing the measurement result by the color sensor signal processing circuit 61 is obtained. The density value of the color patch is calculated on the basis of the measurement results in S303 and S304. When the color patch is measured using the color sensor 60, the recording medium 5 is to be conveyed. The conveyance may be performed in either a forward direction from the upstream to the downstream or a reverse direction from the downstream to the upstream, but a period spent for the whole color calibration can be shortened when the conveyance is performed in the reverse direction. In S305, it is confirmed whether or not an error has occurred during the processing so far. In a case where the error has occurred, the flow proceeds to S311, and in a case where no error has occurred, the flow proceeds to S306. The error occurring herein is relevant to a case where the conveyance of the recording medium 5 is jammed during recording or reading of the color patch, or the like. In S306, it is confirmed whether or not a cancellation instruction by the user is input during the processing so far. In a case where the cancellation instruction is input, the flow proceeds to S311, and in a case where the cancellation instruction is not input, the flow proceeds to S307. It is noted that the flow may immediately proceed to S311 at respective timings when the error has occurred in the confirmation in S305 and the cancellation is input in the confirmation in S306. In S307, the correction value is calculated from the density value of the color patch calculated in S304. In S308, it is determined whether or not the calculated correction value is within a normal range. When the correction value is within the normal range, it is regarded that the color calibration is normally executed, and the flow proceeds to S309. In a case where the correction value is not within the normal range, it is regarded that the color calibration is not normally executed, and the flow proceeds to S311. In S309, the calculated correction value is stored in the system memory 18 as correction data used for the color shift correction processing at the time of the image recording for each type of the recording medium. According to the present embodiment, the correction value is generated as the above-described one-dimensional LUT 84 for color shift correction. In a case where the color calibration is normally performed, in S310, the execution state stored in the system memory 18 is updated to "executed" with regard to the recording medium of the type where the color calibration has been executed, and the execution date is also stored to end this flow. In a case where the color calibration is not normally performed, the execution state is updated to "execution pending" in S311, and the pending factor is also updated to "color calibration failure" in S312 to end this flow.

Figure 9A:
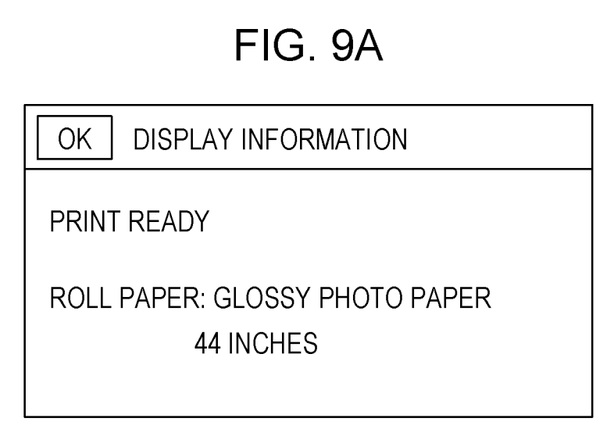
FIGS. 9A and 9B illustrate a screen displayed on a display panel.
Figure 9B:
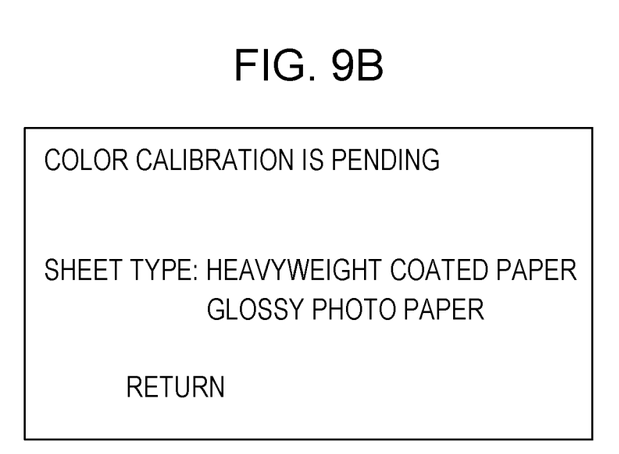

FIG. 9A illustrates a screen displayed on the display panel 9 when the image recording can be performed in the image recording apparatus 1. In a case where the recording medium 5 is fed, a type and a size of the recording medium 5 are displayed. In a case where the recording medium exists where the execution state of the color calibration stored in the memory is "execution pending", a message mentioning that information is to be displayed when the OK key of the operation key 8 is pressed is displayed on an upper part of the screen. When the user presses the OK key, a screen of FIG. 9B is displayed. A list of types of recording media where the execution state of the color calibration is "execution pending" is displayed on this screen. With this screen, the user can be urged to execute the color calibration. When the OK key is pressed again, the screen of FIG. 9A is displayed.

Figure 10:
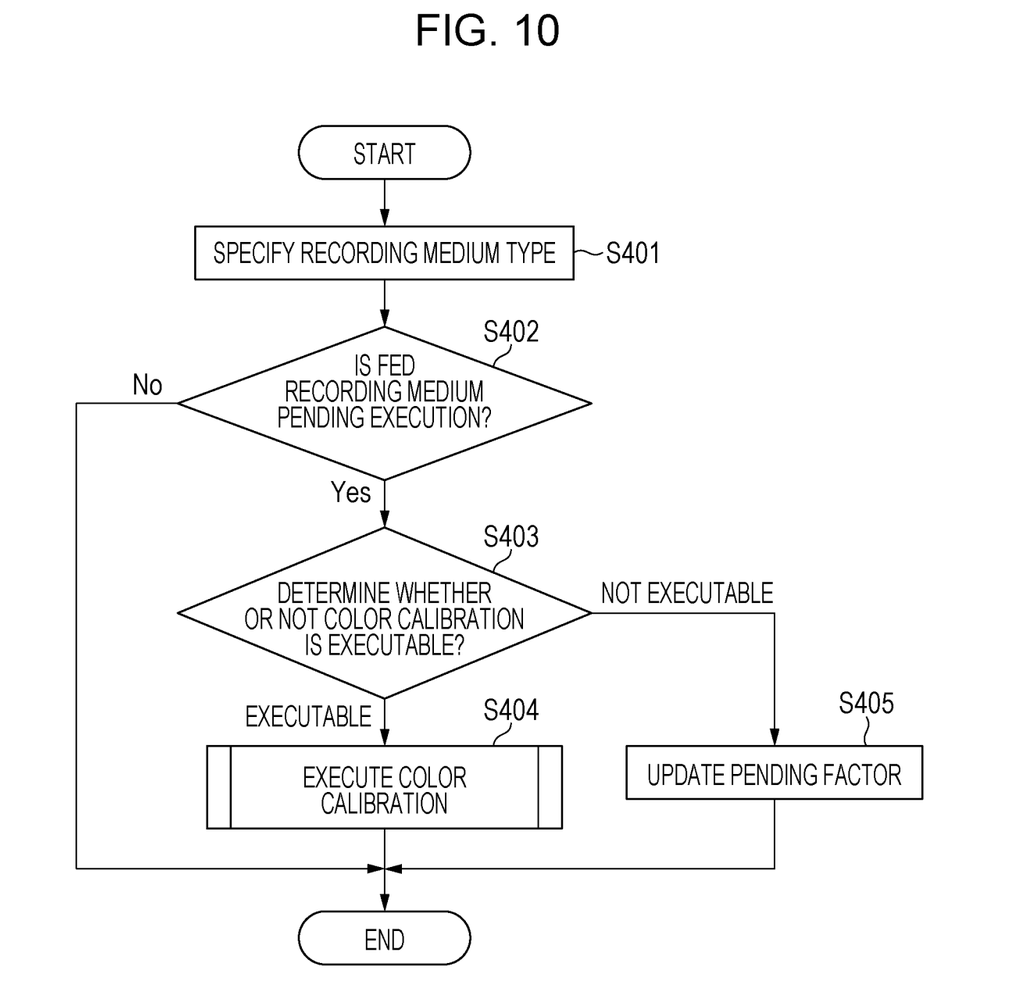
FIG. 10 is a flowchart of processing for determining again whether or not the calibration is executed.

FIG. 10 is a flowchart illustrating processing for determining the execution propriety of the color calibration again with respect to the recording medium of the type where the execution state of the color calibration becomes "execution pending" in step S106 of FIG. 5. FIG. 10 is an example in a case where the pending factor is "no feed". Feed of the recording medium of the type where the information "no feed" is stored is monitored, and the processing is executed in a case where the feed of the recording medium is sensed. As described above, the monitoring is periodically performed, and repeatedly executed every second according to the present embodiment. It is noted that as a method of sensing the feed of the recording medium, the information may be obtained when the user makes a selection using the operation key 8 and the display panel 9.

In S401, a type of the fed recording medium 5 is specified. In S402, it is confirmed whether or not the execution state of the color calibration is "execution pending" with regard to the recording medium of the specified type. Whether or not the state is "execution pending" is determined by reading out the information held in the system memory 18 as illustrated in FIG. 8. In a case where the state is "execution pending", the flow proceeds to S403, and when this is not the case, this flow is ended. It is determined in S403 whether the color calibration is executable. In a case where the color calibration is executable, the flow proceeds to S404, and in a case where the color calibration is not executable, the flow proceeds to S405. The determination in S403 is performed by executing the flow in FIG. 6 described above. In S404, the color calibration processing described in the flow in FIG. 7 described above is executed, and this flow is ended. The pending factor is updated in S405, and this flow is ended. It is noted that when it is determined that the color calibration is not executable, the color calibration is not executed, and the executing pending state remains. The information indicating the execution state is updated to the newly determined pending factor.

It is noted that according to the present embodiment, a case has been described as an example where the pending factor of "execution pending" is "no feed", but similar monitoring can be performed with regard to other pending factors. For example, in a case where the pending factor is "remaining ink amount is low", monitoring is performed on whether or not the ink tank is replaced. In a case where the replacement of the ink tank is sensed, the execution propriety determination of the color calibration is performed again. In a case where the pending factor is "image recording apparatus has error" or "color sensor has error", monitoring is performed on whether or not the error in each apparatus is eliminated. In a case where the elimination is sensed, the execution propriety determination of the color calibration is performed again. In either case, the execution propriety is determined again, and in a case where it is determined that the color calibration is executable, the color calibration is automatically executed.

As described above, according to the present embodiment, it is determined whether or not the execution of the color calibration is necessary. In a case where it is determined that the execution is necessary, when the color calibration is executable, the color calibration is immediately executed. In a case where the execution is not to be performed, the execution becomes pending. Furthermore, even in a case where the execution of the color calibration becomes pending due to a reason that the recording medium is not fed or the like, whether or not the execution becomes executable is periodically monitored, and the color calibration is automatically executed in a case where the execution becomes executable. Thus, the user can perform the operation without being conscious about the color calibration, and user burden can be reduced while the recording image quality is ensured.

It is noted that according to the present embodiment, the determination on the calibration execution is performed in the image recording apparatus 1 or the host apparatus 2, but the user may select whether the color calibration is immediately executed when the recording job is received, or the recording is performed ahead of the color calibration. In a case where the recording job is received, and also it is determined in S104 of FIG. 5 that the color calibration is executable, before the color calibration is executed, the user is asked to confirm whether or not the color calibration is to be executed. At this time, a screen for urging the user to make a selection is displayed on the display panel 9. A button "execute immediately" and a button "execute after recording" are displayed on the screen to accept the selection from the user using the operation key 8 and the OK key. In a case where "execute immediately" is selected, the color calibration is executed. In a case where "execute after recording" is selected, the execution state is set as "execution pending". After the end of the recording job, it is confirmed whether or not the execution state of the recording medium of the type being fed is "execution pending". In a case where the state is "execution pending", it is determined again whether or not the color calibration is executable. In a case where the color calibration is executable, the calibration flow in FIG. 7 is executed. After the color calibration execution, the execution state is updated to "executed", and this processing is ended.

In accordance with the above-described configuration, the recording is prioritized in a case where the user desires to obtain the record product earlier, and the color calibration is prioritized in a case where the user desires to prioritize ensuring of the recording image quality. Thus, it is possible to execute the processing appropriate to an intention of the user.

It is noted that in the image recording apparatus 1 illustrated in FIG. 2 and FIGS. 3A and 3B described above, it is determined that the feed operation is completed when the recording medium 5 is conveyed to the location facing the recording head 44, and the image is recordable. An example of an operation up to the completion of the feed includes a method for the image recording apparatus 1 to automatically sense the leading edge of the recording medium 5 and automatically feed in addition to the method for the user to manually insert the leading edge of the recording medium 5 into the feed portion. In this case, the user does not need to manually perform the insertion into the feed portion, and it is sufficient when the roll paper is just set in the roll paper holder. When a mechanism for detecting peeling of the leading edge of the recording medium 5 to be fed into a conveyance path is disposed in the image recording apparatus 1, the feed operation can be automatically executed. In the above-described case too, when the feed operation to the location facing the recording head is completed, it is determined that the recording medium 5 is fed.

Furthermore, in a mode in which the feed operation can be automatically executed, an apparatus in which a plurality of roll paper holders are mounted may also be used. In this case, even when the recording medium held in one holder is in a state of being fed to the location facing the recording head, the recording medium held in the other holder can be automatically fed without the intermediation of the user. That is, the image recording apparatus can cause the fed recording medium to retract and cause the other recording medium to be fed to a location facing the recording medium.

It is noted that when the recording medium is held in the roll paper holder, the feed operation can be automatically executed. Therefore, in terms of whether or not the color calibration is executable without intermediation of the user, a state where the color calibration is executable may be determined by detecting information indicating that the recording medium is held in the roll paper holder.

It is noted that according to the above-described embodiment, when the instruction for the color calibration execution is accepted, it is determined whether or not the color calibration is executable, but the present invention can be applied to a maintenance instruction other than the color calibration. The present invention can be applied not only to the calibration but also to a configuration in which the test pattern is recorded on the recording medium, and correction or maintenance is executed on the basis of a measurement result of the test pattern.

According to the embodiments of the present invention, the image recording apparatus determines the necessary condition for the execution of the calibration, and executes the calibration in accordance with the determination result. Thus, the calibration can be executed at an appropriate timing, and further, the user burden can be reduced.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2019-068048, filed Mar. 29, 2019, which is hereby incorporated by reference herein in its entirety.

What is claimed is:

1. An image recording apparatus comprising:
    a recording unit configured to record an image on a recording medium by applying a recording material based on image data;
    a first determination unit configured to determine whether or not it is necessary to execute calibration, wherein the calibration includes recording a test pattern on the recording medium using the recording unit and measuring the test pattern;
    a second determination unit configured to determine whether or not a predetermined target recording medium of one or more types is set to be recordable in accordance with a determination result of the first determination unit; and
    an execution unit configured to execute the calibration using the predetermined target recording medium determined by the second determination unit as being set.

2. The image recording apparatus according to claim 1, wherein, in a case where information is obtained that indicates that the predetermined target recording medium is set in a location facing the recording unit, the second determination unit is configured to determine that the predetermined target recording medium is set in a state where the test pattern is recordable.

3. The image recording apparatus according to claim 1, further comprising:
    a holding unit configured to hold recording media of plural types; and
    a conveyance unit configured to feed a recording medium of any of the plural types to a location facing the recording unit and to retract the recording medium of any of the plural types from said location.

4. The image recording apparatus according to claim 1, wherein the first determination unit determines whether or not it is necessary to execute the calibration based on type information for designating a type of a recording medium to be used.

5. The image recording apparatus according to claim 4, wherein the execution unit is configured to execute the calibration with regard to a type of the recording medium determined by the second determination unit as being set in a state where the test pattern is recordable.

6. The image recording apparatus according to claim 1, further comprising a storage unit configured to store execution information indicating determination results determined by the first determination unit.

7. The image recording apparatus according to claim 1, wherein the second determination unit is configured to further determine whether or not one or more conditions related to the execution of the calibration are satisfied, and
    wherein the execution unit is configured to execute the calibration in a case where it is determined that a recording medium of a type used for the calibration is set in a state where the test pattern is recordable, and that the one or more conditions are all satisfied.

8. The image recording apparatus according to claim 7, wherein the one or more conditions include at least one of whether or not an amount of held recording medium is higher than a predetermined amount, whether or not an amount of the recording material is higher than a predetermined amount, whether or not the recording unit is in a state where the recording unit is capable of recording the test pattern, whether or not a measurement unit is in a state where the measurement unit is capable of measuring the test pattern, and whether or not recording of a recording job received by the first determination unit is prioritized.

9. The image recording apparatus according to claim 1, further comprising a second storage unit configured to store information indicating a factor in which the calibration is not executed based on the determination by the second determination unit.

10. The image recording apparatus according to claim 1, wherein the second determination unit is configured to repeat the determination each time a predetermined period elapses.

11. The image recording apparatus according to claim 1, wherein an instruction to execute the calibration is received by the first determination unit in at least one time including a time when recording is performed for a predetermined number of sheets after the execution of a previous calibration, a time when a predetermined number of days elapse after the execution of the previous calibration, a case where the recording unit is replaced after the execution of the previous calibration, and a predetermined period elapsed since a previous recording operation is ended.

12. The image recording apparatus according to claim 1, further comprising a correction unit configured to correct the image data based on a measurement result when the execution unit executes the calibration.

13. The image recording apparatus according to claim 1, further comprising an acceptance unit configured to accept an instruction to execute the calibration from an external apparatus,
    wherein the first determination unit determines that it is necessary to execute the calibration in accordance with an acceptance of the instruction.

14. The image recording apparatus according to claim 1, wherein, in a case where the predetermined target recording medium is not set to be recordable in a printing apparatus, the second determination unit is configured to determine after a predetermined period has elapsed and the printing apparatus is in a state where the test pattern is recordable, whether or not the recording medium being set in the printing apparatus is the predetermined target recording medium.

15. The image recording apparatus according to claim 1, wherein setting the predetermined target recording medium includes inserting a leading edge of the predetermined target recording medium into a feed portion and feeding the leading edge into a location facing the recording unit.

16. The image recording apparatus according to claim 1, wherein the first determination unit determines whether or not it is necessary to execute the calibration in at least one of a plurality of timings including:
    a timing when a power supply is turned on,
    a timing when a recording job is received,
    a timing when a recording job is ended,
    a timing at each time a predetermined number of days elapse, a timing when an instruction to execute the calibration is issued by a user, a timing when an instruction to execute the calibration is issued by an external apparatus, and a timing when information indicating that a recording medium is newly set is obtained.

17. A control method for an image processing apparatus that records an image on a recording medium by applying a recording material based on image data, the method comprising:

determining, as a first determination, whether or not it is necessary for the image processing apparatus to execute calibration, wherein the calibration includes recording a test pattern on the recording medium and measuring the test pattern;

determining, as a second determination, whether or not predetermined target recording medium of one or more types is set to be recordable in accordance with a determination result of the first determination; and executing the calibration using the predetermined target recording medium determined by the second determination as being set.

18. A non-transitory computer-readable storage medium storing a program that, when executed by an image processing apparatus, causes the image processing apparatus to perform the control method according to claim 17.

19. The control method according to claim 17, wherein the first determination is performed in at least one of a plurality of timings including:

a timing when a power supply is turned on, a timing when a recording job is received, a timing when a recording job is ended, a timing at each time a predetermined number of days elapse, a timing when an instruction to execute the calibration is issued by the user, a timing when an instruction to execute the calibration is issued by an external apparatus, and a timing when information indicating that a recording medium is newly set is obtained.

* * * * *